(No Model.)

R. C. SMITH.
HOISTING MACHINE.

No. 307,813. Patented Nov. 11, 1884.

Witnesses:
John G. Hinkel
A. E. Hansmann.

R. C. Smith,
Inventor:
By Foster & Freeman
Attorneys.

United States Patent Office.

RUDOLPH C. SMITH, OF NEW YORK, N. Y.

HOISTING-MACHINE.

SPECIFICATION forming part of Letters Patent No. 307,813, dated November 11, 1884.

Application filed May 5, 1884. (No model.)

*To all whom it may concern:*

Be it known that I, RUDOLPH C. SMITH, a citizen of the United States, residing in the city, county, and State of New York, have invented certain new and useful Improvements in Hoisting-Machines, of which the following is a specification.

My invention relates to that class of hoisting-machines in which the cage is elevated by winding the elevating-rope upon a drum driven from an engine; and my invention consists in means, fully set forth hereinafter, whereby to prevent the vibrations which are ordinarily transmitted from the engine to the cage through the connecting-rope.

Figure 1:
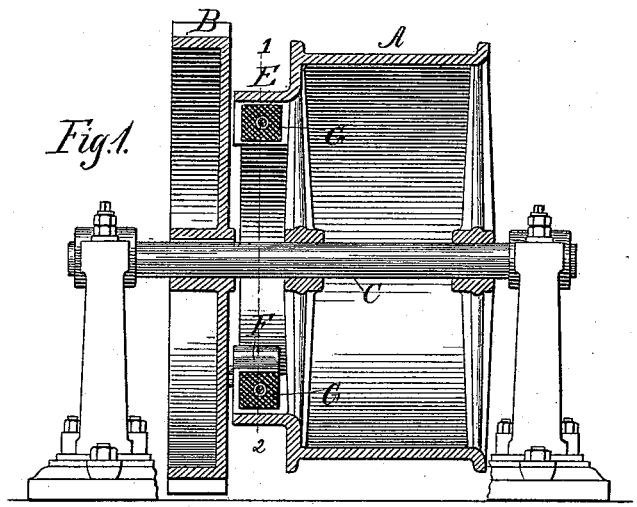
Figure 2:
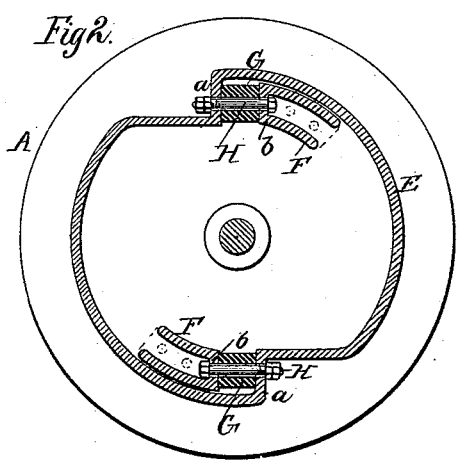
Figure 3:
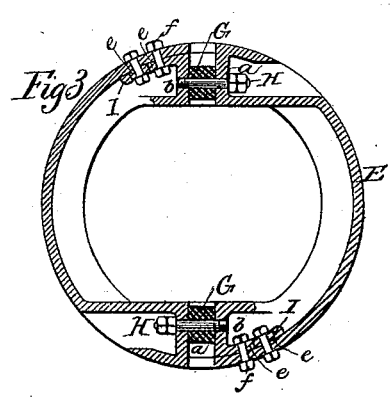
Figure 4:
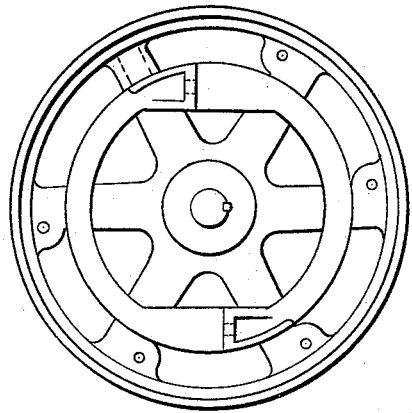

In the drawings, Figure 1 is a sectional elevation showing the drum, shaft-bearings, shaft, and driving-wheel of an ordinary elevator, the driving-wheels being provided with the usual peripheral teeth for gearing with a pinion upon the driving-shaft of an engine. Fig. 2 is a section on the line 1 2, Fig. 1. Fig. 3 is a section similar to Fig. 2, illustrating a modification; and Fig. 4 is an end view of the wheel in the machine illustrated in Fig. 3.

As ordinarily constructed, the winding-drums A of hoisting-engines are connected to or form parts of the driving-wheels B, and both are mounted upon a shaft, C, supported by suitable bearings, and are turned directly by the engine, a pinion upon the driving-shafts of which gears with peripheral teeth of the driving-wheel. As the cage is connected to the cable wound upon the drum A, any irregularity in the movement of the driving-wheel connected to the drum as aforesaid, and resulting in slip of the teeth or irregular movement of the driving-shaft, is communicated to the cage, so that in most steam-elevators the cage moves with a slight jarring motion, which is both disagreeable and injurious to the structure. I have found that a steady and uniform movement may be imparted to the cage by interposing between the drum and the driving-wheel an elastic substance under such compression as will insure the transmission of power from one to the other, but sufficiently yielding as to absorb the slight vibrations resulting from irregular action, as aforesaid.

Different modes of securing an elastic bearing of the drum upon the driving-wheel may be employed, and the interposed elastic substance may be rubber, soft wood, compressed sponge, or metallic springs arranged between bearings, one or more of which is upon the driving-wheel and the other or others upon the drum.

In Figs. 1 and 2 the drum is shown as provided with an end flange, E, which is circular, except at two points, where it is bent to form seats or bearings $a$; and the driving-wheel B is provided with two lugs or projections, F, each terminating in a seat or bearing, $b$, and between each of the bearings $a\ b$ is interposed a block of rubber, G. A bolt, H, extends through each bearing $a\ b$ and through the interposed elastic material, and is provided with nuts, so that the bearings may be brought together to clamp the said material under great pressure, thus practically uniting the drum and driver in one structure, yet forming a yielding connection, which prevents the transmission of slight vibrations from the driver to the drum.

In Figs. 3 and 4 the bearings $a$ form each part of a curved flange, E, which extends over a curved flange, I, connected with the bearing $b$, and the flanges I are provided with slots $e$, which receive bolts $f$, extending through the flanges E, so as to permit a free but limited play of the parts in respect to each other.

It will be apparent that any suitable number of elastic blocks or their equivalents may be employed, and that different appliances may be used for compressing them between their bearings without interfering with the movement of said bearings.

Without limiting myself to the precise construction and arrangement of parts shown, I claim—

1. A hoisting-machine provided with a drum and a driving-wheel, and with elastic substance interposed between bearings on the drum and upon the driving-wheel, substantially as set forth.

2. The combination of the drum provided with bearings, and the driving-wheel provided with bearings, and an elastic substance interposed between said bearings, substantially as described.

3. The combination of the drum, driving-wheel, seats or bearings upon both the drum and wheel, interposed elastic material, and means, substantially as shown and described, for bringing the bearings together upon the elastic material without interfering with the limited independent movements of said bearings, substantially as set forth.

In testimony whereof I have signed my name to this specification in the presence of two subscribing witnesses.

RUDOLPH C. SMITH.

Witnesses:
L. H. JOHNSON,
B. DONOHUE.